No. 802,536. PATENTED OCT. 24, 1905.
A. W. THOMAS.
GRINDING AND POLISHING WHEEL.
APPLICATION FILED SEPT. 26, 1904.
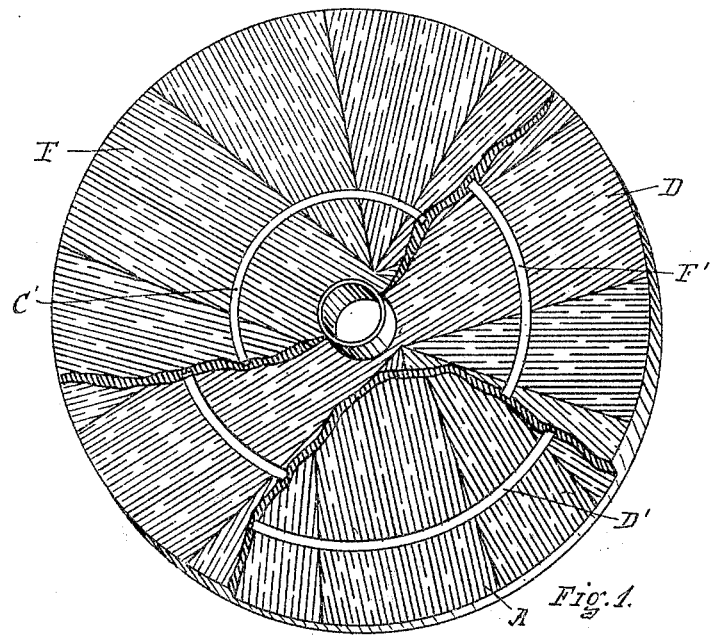
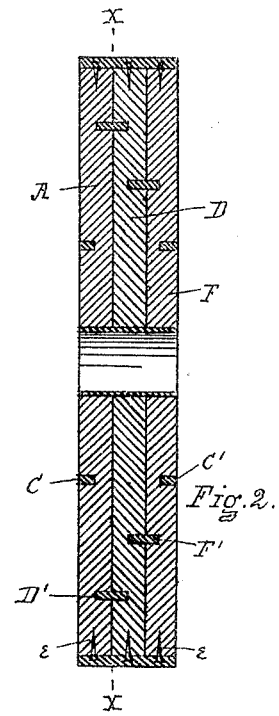
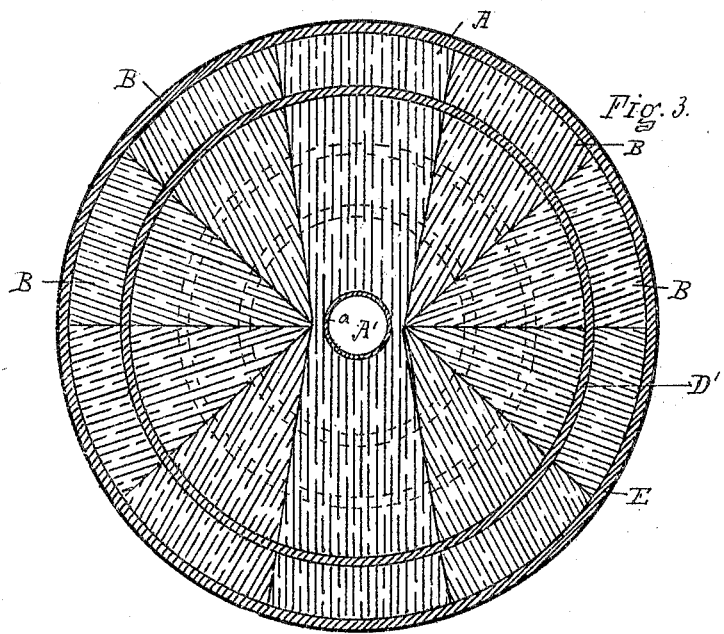
WITNESSES
Rich. A. George
E. P. DeGiorgi
INVENTOR
ALBION W. THOMAS
BY Risley & Love
ATTORNEYS.

UNITED STATES PATENT OFFICE.

ALBION W. THOMAS, OF ROME, NEW YORK, ASSIGNOR TO LEON V. JONES, OF ROME, NEW YORK.

GRINDING AND POLISHING WHEEL.

No. 802,536.  Specification of Letters Patent.  Patented Oct. 24, 1905.

Application filed September 26, 1904. Serial No. 225,948.

*To all whom it may concern:*

Be it known that I, ALBION W. THOMAS, a citizen of the United States, residing at Rome, in the county of Oneida and State of New York, have invented certain new and useful Improvements in Grinding and Polishing Wheels, of which the following is a specification, reference being had therein to the accompanying drawings.

My invention relates to an improved grinding or polishing wheel, and I declare that the following is a full, clear, concise, and exact description thereof, sufficient to enable one skilled in the art to make and use the same, reference being had to the accompanying drawings, in which like letters refer to like parts throughout.

My invention has numerous advantages, which reside in the fact, among others, that it is made of light material (wood being shown) put together in such way that shrinkage will not destroy the perfect curve of the periphery and that it is constructed and mounted in such a way as to be able to take a much greater velocity than an emery-wheel of the former style; that it can be mounted on the arbor and held true by collars thereon pressing against the face of the wheel to hold the same straight; that a higher velocity may be given and maintained without taking the temper from the article to be ground, all of which, among other advantages, will appear from the following description and claims.

The wheel is to be used for polishing, grinding, and other work by the use of carborundum, emery, or the like.

In the drawings, Figure 1 is a perspective view of the wheel, showing the assembling of the different layers. Fig. 2 is a sectional view of the wheel, and Fig. 3 is a plan view on the line $x$ $x$ of Fig. 2.

I preferably make the wheel of wood, it being composed of several pieces, which are assembled as indicated in Fig. 3, and in the present instance showing three such layers. In each of these layers I provide a piece A, which extends diametrically across the wheel and is provided with a central bore A' for the arbor and having therein the bushing $a$. It is evident that the swift revolution of the wheel cannot tear the part A from the arbor or break it in any way. Each side of the piece A is cut substantially the shape indicated, and into the angle thus formed is inserted a suitable number of parts B, coming to a common center against the edge of the part A. These several pieces are cemented together by a waterproof cement which I provide for the purpose. The grain of each of the pieces A and B runs substantially radially from the center, or, in other words, none of the pieces have the grain running crosswise. Before a layer is put together in this way each of the pieces is thoroughly dried, so as to take out all possible shrinkage, and the pores of the wood are or may be suitably filled to exclude moisture. The parts B, as well as the part A, having the grain running toward the center renders it impossible for the parts of the wheel to become separated under centrifugal force. For further strengthening the wheel and to secure the pieces I provide a leather ring C, Fig. 2, the edge of which is let into the surface of the layer and is firmly glued therein, holding each part in place. The other edge of this ring C provides a hard surface for the bearing of the collar, which holds the wheel onto the arbor and keeps it true in its revolution, which might not be the case if the collar was crowded onto the wooden surface of the wheel.

A wheel of my construction is generally made up of a plurality of such wheels or layers as I have described; but each layer is made in substantially the same way. They are mounted with the same common center, but the part A is given a different direction in each succeeding layer, as indicated in Fig. 1, where—

A represents the corresponding part shown in Fig. 3. D represents the corresponding part of the next or middle layer, and F the corresponding part of the third or other layer. These layers are secured together by the non-porous cement or glue of which I have spoken and are also provided with leather rings similar to C.

In Fig. 3 D' indicates a ring holding together the layers containing the parts A and D. F', Fig. 2, illustrates a similar ring holding together the layers which contain the parts D and F. The layer which has part F has a ring C', corresponding in place and size to ring C. It should be noted that Fig. 3 is intended simply to illustrate the position of the three layers when mounted and not to indicate any particular portion of the layers shown—that is, A refers to the layer containing part A; D, to that containing part D; and F, containing that part. When the parts of each layer are thus assembled, and the layers securely connected, the outer periphery is trued and on it is securely fixed a leather collar E by wooden pins $e$ and cement, or otherwise suitably. This leather is previously treated to render it non-porous and on its outer surface is applied a composition of wax and emery or carborundum, which I provide for that purpose in suitable form to be readily put onto the wheel by the operator as occasion demands. It is known that in the use of ordinary emery and similar wheels a high velocity generates heat, which will take the temper out of the article to be ground; but in this case the heat is largely expended in melting the wax which carries the emery, so that the latter is supported in the semiliquid condition of the wax on the surface of the wheel. Of course the cutting material can be added as occasion demands, so that no wear comes upon the leather which carries it and which is so evenly and firmly secured to the surface of the wheel that it cannot buckle or double and always furnishes a flat solid surface for the grinding.

It will be understood that I do not confine myself to the particulars shown in form, or material, or purpose of the wheel and that various modifications can be made without departing from the spirit of my invention, since I illustrate but one means of building up a light, strong, and cheap wheel which can be used for any purpose, in this instance to provide a grinding-surface.

Having described my invention, what I claim as new, and desire to secure by Letters Patent, is—

1. A device of the character described having a layer which comprises a single piece extending across the center of the wheel and bored for an arbor, with other pieces with sides converging thereto and having means inserted therein and in the single piece to secure them relatively to the center of the wheel, substantially as described.

2. In a device of the character described, a wheel comprised of a plurality of layers, each layer having a central member extending diametrically across the wheel and each of said members of the several layers disposed at a different angle relative to the others, and means engaging the several members of the several layers to hold them relative to the center of the wheel, substantially as described.

3. In a device of the character described, a wheel made up of a plurality of parts, one of said parts extending diametrically across the wheel and being pierced for the arbor, and the other of said parts being grouped radially at the sides of said piece, the said wheel being provided with a non-porous peripheral band adapted to support a grinding-surface, substantially as described.

4. A device of the character described composed of a plurality of layers, each layer having a member bored for the center of the wheel and having sides diverging to form an obtuse angle and having parts grouped in said angle, and a ring-like member recessed into the parts of each layer, and ring-like members recessed into the parts of adjoining layers, the said layers being provided on the periphery with a non-porous leather collar secured thereon and provided with a surface adapted to receive and carry grinding material, substantially as described.

5. A wheel of the character described comprising one or more layers, each of the same being composed of a single piece extending diametrically across its layer and having grouped in each of said layers radially-extending pieces to complete the layer, the grain of each member of each layer running substantially radially of the center of the layer, the said construction being bored for an arbor, substantially as described.

6. A wheel of the character described comprising one or more layers, each of the same being composed of a single piece extending diametrically across its layer and having grouped on each of said layers radially-extending pieces to complete the surface of the layer, the grain of each member of each layer running substantially radially of the center of the layer, the said construction being bored for an arbor and being provided with a peripheral non-porous band with grinding material thereon, substantially as described.

7. A wheel of the character described composed of one or more layers, each layer being built up of an integral member lying diametrically across the layer and of sector-like members grouped on each side thereof, means engaging the several members of each layer and the several layers to hold the members of each layer and the adjacent layer relatively to the center of the wheel, substantially as described.

8. A wheel comprising one or more layers each made up of diametrically disposed members with sector-like members arranged therewith all rigidly connected, and a non-porous peripheral surface to maintain grinding material thereon at a fixed consistency, substantially as described.

In testimony whereof I affix my signature in presence of two witnesses.

ALBION W. THOMAS.

Witnesses:
   FRANK Z. JONES,
   SADIE M. PAYNE.